(12) United States Patent
Matsuoka et al.

(10) Patent No.: US 7,356,719 B2
(45) Date of Patent: Apr. 8, 2008

(54) MICROCOMPUTER

(75) Inventors: Toshihiko Matsuoka, Nukata-gun (JP);
Hideaki Ishihara, Okazaki (JP);
Yukari Sugiura, Yokohama (JP)

(73) Assignee: DENSO CORPORATION, Kariya (JP)

( * ) Notice: Subject to any disclaimer, the term of this patent is extended or adjusted under 35 U.S.C. 154(b) by 109 days.

(21) Appl. No.: 11/357,372

(22) Filed: Feb. 21, 2006

(65) Prior Publication Data

US 2006/0195711 A1    Aug. 31, 2006

(30) Foreign Application Priority Data

Feb. 28, 2005  (JP)  ............... 2005-053049
Nov. 25, 2005  (JP)  ............... 2005-340445

(51) Int. Cl.
*G06F 1/26* (2006.01)
(52) U.S. Cl. ............... 713/322; 331/135; 331/176
(58) Field of Classification Search ............... 331/66, 331/176, 135, 108 B; 713/322
See application file for complete search history.

(56) References Cited

U.S. PATENT DOCUMENTS 6,853,259 B2 * 2/2005 Norman et al. ............... 331/66
7,148,763 B2 * 12/2006 Sutardja ............... 331/176

FOREIGN PATENT DOCUMENTS

| JP | A-60-81921 | 5/1985 |
| JP | A-5-75445 | 3/1993 |
| JP | A-2001-24486 | 1/2001 |
| JP | A-2002-50927 | 2/2002 |

* cited by examiner

*Primary Examiner*—Joseph Chang
(74) *Attorney, Agent, or Firm*—Posz Law Group, PLC (57) ABSTRACT

In an EEPROM of a microcomputer, data is stored for determining a communication rate CMR for fixing the data transmission time of one frame managed by a communication circuit on the basis of an oscillation output characteristic of a CR oscillating circuit that varies in accordance with temperature. CPU reads out data stored in EEPROM in accordance with the temperature detected by a temperature detecting circuit, and sets the determined communication CMR into the communication circuit.

14 Claims, 9 Drawing Sheets

| AD CONVERSION VALUE | TEMPERATURE | GRADIENT | INTERCEPT |
|---|---|---|---|
| 500−490 | −40°C − −30°C | 50 | 391 |
| 490−480 | −30°C − −20°C | 51 | 390 |
| 480−470 | −20°C − −10°C | 49 | 388 |
| . . . | . . . | . . . | . . . |
| . . . | . . . | . . . | . . . |

| AD CONVERSION VALUE | TEMPERATURE | GRADIENT | INTERCEPT | COMM. RATE |
|---|---|---|---|---|
| 500−490 | −40°C− −30°C | 50 | 391 | 415 |
| 490−480 | −30°C− −20°C | 51 | 390 | 415 |
| 480−470 | −20°C− −10°C | 49 | 388 | 416 |
| ... | ... | ... | ... | ... |
| ... | ... | ... | ... | ... |

MICROCOMPUTER

CROSS REFERENCE TO RELATED APPLICATIONS

This application is based upon, claims the benefit of priority of, and incorporates by reference the contents of, Japanese Patent Application Nos. 2005-340445 filed on Nov. 25, 2005 and 2005-53049 filed on Feb. 28, 2005.

TECHNICAL FIELD

The technical field relates to a microcomputer having a processing circuit for managing the time needed to execute predetermined processing on the basis of an oscillation signal output from a CR oscillating circuit.

BACKGROUND

For example, when a clock signal used in a microcomputer is achieved, a high-precision clock signal having a stable oscillation frequency can be achieved by constructing an oscillating circuit using an oscillator. However, the oscillator is a relatively expensive element, and thus a CR oscillating circuit may be used for the purpose of reduction in cost. With respect to the CR oscillator circuit, the oscillation frequency would vary if the surrounding temperature varies. Accordingly, when predetermined processing is carried out on the basis of an oscillation output from the CR oscillating circuit, some correction must be made so that the oscillation frequency is kept constant if it is necessary to secure isochronism for the time required to execute the processing.

Figure 12:
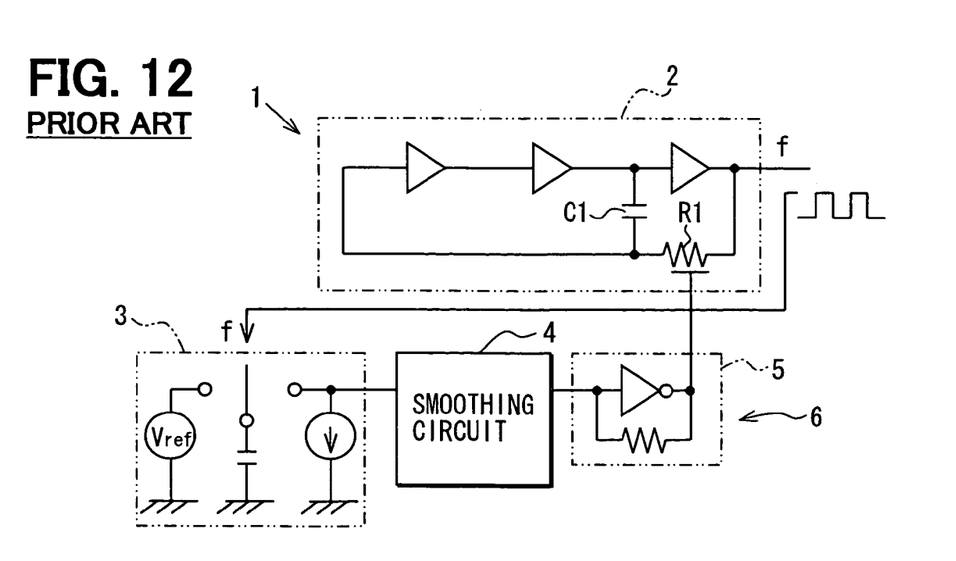
FIG. 12 is a diagram showing a prior art disclosed in JP-A-60-81921.

FIG. 12 shows the construction of an IC oscillator 1 disclosed in JP-A-60-81921 as an example of the construction for carrying out the above correction. The IC oscillator 1 is provided with a correcting circuit 6 comprising a smoothing circuit 4 and an amplifier 5 for a CR oscillating circuit 2 whose oscillation frequency f is determined on the basis of the capacitance of a capacitor C1 and the resistance value of a varistor R1. That is, the oscillation output of the CR oscillating circuit 2 is supplied as a switching control signal for a switched capacitor 3, and converted to a DC voltage in accordance with the oscillation frequency f. The DC voltage is smoothed by the smoothing circuit 4 and then amplified by the amplifier 5. The thus-amplified voltage is applied to the varistor R1 to change the resistance of the varistor R1, thereby correcting the oscillation frequency f.

According to the above construction, the charging/discharging of the capacitor C1 is automatically adjusted in accordance with the formation state of the IC oscillator 1 even when some dispersion occurs in the threshold value voltage or the gate delay time, thereby correcting the oscillation frequency f so that the oscillation frequency f is constant.

However, the technique disclosed in JP-A-60-81921 requires a switched capacitor 3 having a large-scale circuit construction in order to correct the oscillation frequency f of the CR oscillating circuit 2. Furthermore, the varistor R1 is a circuit element for which it is difficult to establish an IC (integrated circuit) design, and thus when the IC oscillator 1 is actually constructed, for example, a hybrid IC design is required, and thus the circuit construction is complicated.

SUMMARY

In view of the foregoing situation, it is an object to provide a microcomputer that can more easily implement a construction for executing correction so that the time required to execute predetermined processing on the basis of an oscillation output of a CR oscillating circuit is constant under an atmosphere that the temperature varies.

According to a microcomputer of a first aspect, in a storage unit are stored data for determining a control value for fixing the processing time managed by a processing circuit on the basis of an oscillation output characteristic of a CR oscillating circuit varying with temperature. A control circuit reads out data stored in the storage unit in accordance with the temperature detected by a temperature detecting unit, and sets the determined control value into the processing circuit.

That is, even when the oscillation frequency of the CR oscillating circuit varies in accordance with the variation of the temperature, no problem occurs if the time of the processing executed in the processing circuit is fixed as a result. Accordingly, the time of the processing executed in the processing circuit is controlled in accordance with the temperature so that the processing time concerned is fixed, whereby the processing time can be corrected to be fixed by a simple construction without requiring any correcting circuit having a complicated construction for directly varying the time constant of the CR oscillating circuit as disclosed in JP-A-60-81921.

According to a microcomputer of a second aspect, the control circuit reads out the data stored in the storage unit on the basis of the average result of plural temperature values detected by plural temperature detecting units disposed on the periphery of the CR oscillating circuit. That is, the temperature distribution of a semiconductor substrate on which the CR oscillator circuit is mounted is not necessarily constant. Accordingly, the peripheral temperature of the CR oscillating circuit is detected at plural places, and the average value thereof is achieved, whereby the detection precision can be enhanced.

According to a microcomputer of a third aspect, the control circuit calculates and determines a control value on the basis of function parameters read out from the storage unit, and thus the control value can be complemented by a function approximation. Accordingly, the correction can be performed on the basis of a smaller amount of data with higher precision as compared with a case where the control value corresponding to a predetermined temperature range is prepared.

According to a microcomputer of a fourth aspect, the control circuit sets the control value read out from the storage unit into the processing circuit. Therefore, it is unnecessary to calculate and determine the control value, and the correction can be quickly performed.

According to a microcomputer of a fifth aspect, the control circuit periodically sets the control value, and thus the processing time of the processing circuit can be stably kept.

According to a microcomputer of a sixth aspect, when the processing circuit carries out communication processing, the control value is set to a communication rate of the communication processing. That is, in the communication processing, it is required to secure isochronism for the transmission time of data of one frame, for example. Even when the oscillation frequency of the CR oscillating circuit varies in accordance with the temperature variation, by setting the communication rate in conformity with the variation of the frequency, the transmission time can be corrected to be fixed by the offset between the communication rate and the frequency variation.

DETAILED DESCRIPTION OF THE DRAWINGS

DETAILED DESCRIPTION OF THE PREFERRED EMBODIMENTS

Preferred embodiments will be described with reference to the accompanying drawings.

First Embodiment

A first embodiment will be described with reference to FIGS. 1 to 6.

Figure 6:
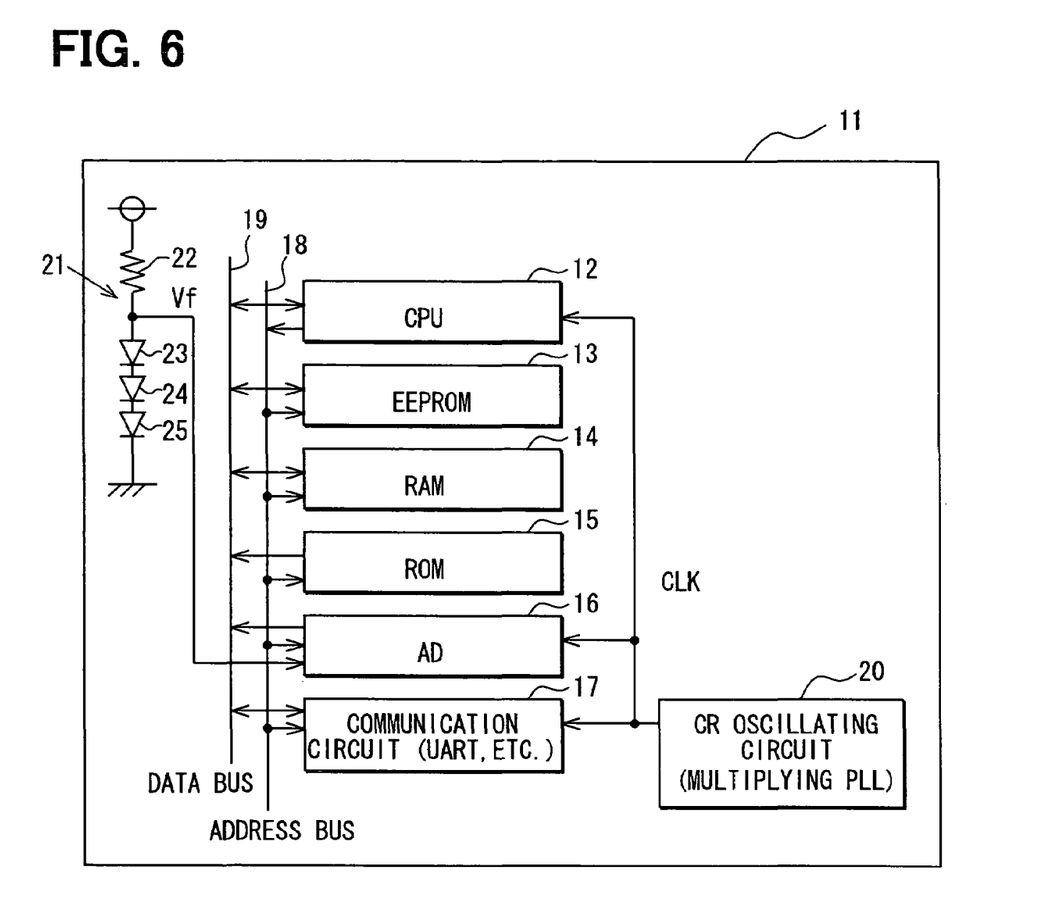
FIG. 6 is a functional block diagram showing the electrical construction of a microcomputer.

FIG. 6 is a functional block diagram showing the electrical construction of a microcomputer 11. The microcomputer 11 is equipped with CPU (control circuit) 12 serving as a main part, EEPROM (storage unit) 13, RAM 14, ROM 15, an A/D conversion circuit 16, for example, a communication circuit (processing circuit) 17 such as a UART (Universal Asynchronous Receiver Transmitter), etc., and these parts are connected through an address bus 18 and a data bus 19. A system clock signal CLK is oscillated and output by a CR oscillating circuit 20, and supplied to CPU 12, the A/D conversion circuit 16 and the communication circuit 17. The CR oscillating circuit 20 also contains a PLL (Phase Locked Loop) circuit for multiplying the oscillation frequency.

Furthermore, the microcomputer 11 is equipped with a temperature detecting circuit (temperature detecting unit) 21. The temperature detecting circuit 21 is constructed by a series circuit comprising a resistor 22 and diodes 23 to 25 (forward connection) connected between the power source and the ground. The common connection point between the resistor 22 and the diode 23 is connected to an analog input port of the A/D conversion circuit 16. That is, the voltage-divided potential Vf at the common connection point is varied in accordance with the temperature. The respective circuits described above are mounted on the same semiconductor substrate, and the microcomputer 11 is constructed by a single chip.

Here, in the CR oscillating circuit 20, the frequency of the oscillation signal CLK is varied in accordance with the temperature as described above. The communication rate (baud rate) of the communication circuit 17 is determined on the basis of the frequency of the oscillation signal CLK, and thus the communication rate is varied when the frequency varies. Accordingly, the time required to transmit the data of one frame by the communication circuit 17 is dispersed.

Therefore, as described later in detail, data for correcting the communication rate (control value) of the communication circuit 17 in accordance with the temperature detected by the temperature detecting circuit 21 are stored in EEPROM 13. During the period when the microcomputer 11 operates, CPU 12 dynamically corrects the communication rate of the communication circuit 17 on the basis of the data stored in EEPROM 13.

Figure 2:
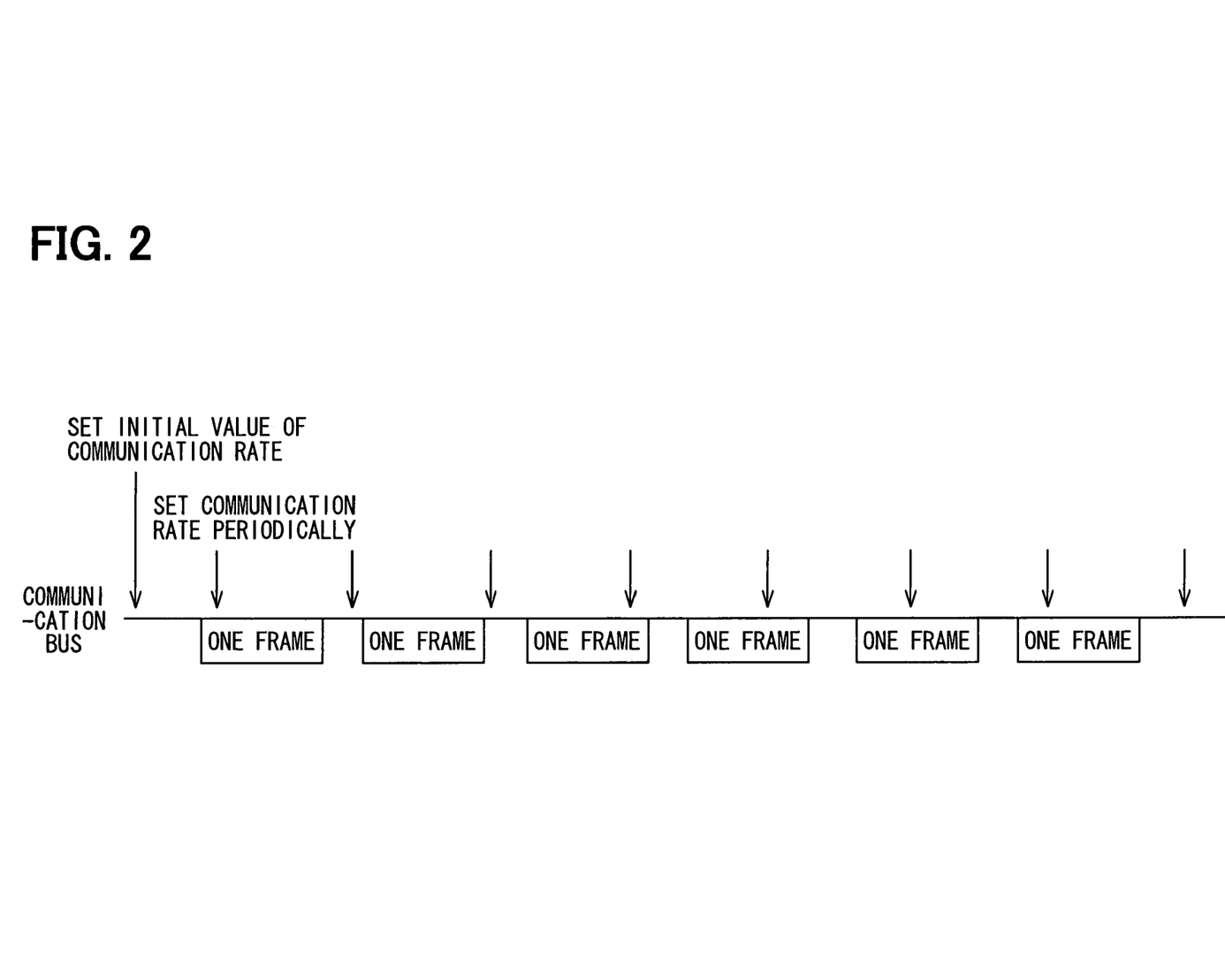
FIG. 2 is a diagram showing an example of correcting timing.
Figure 3:
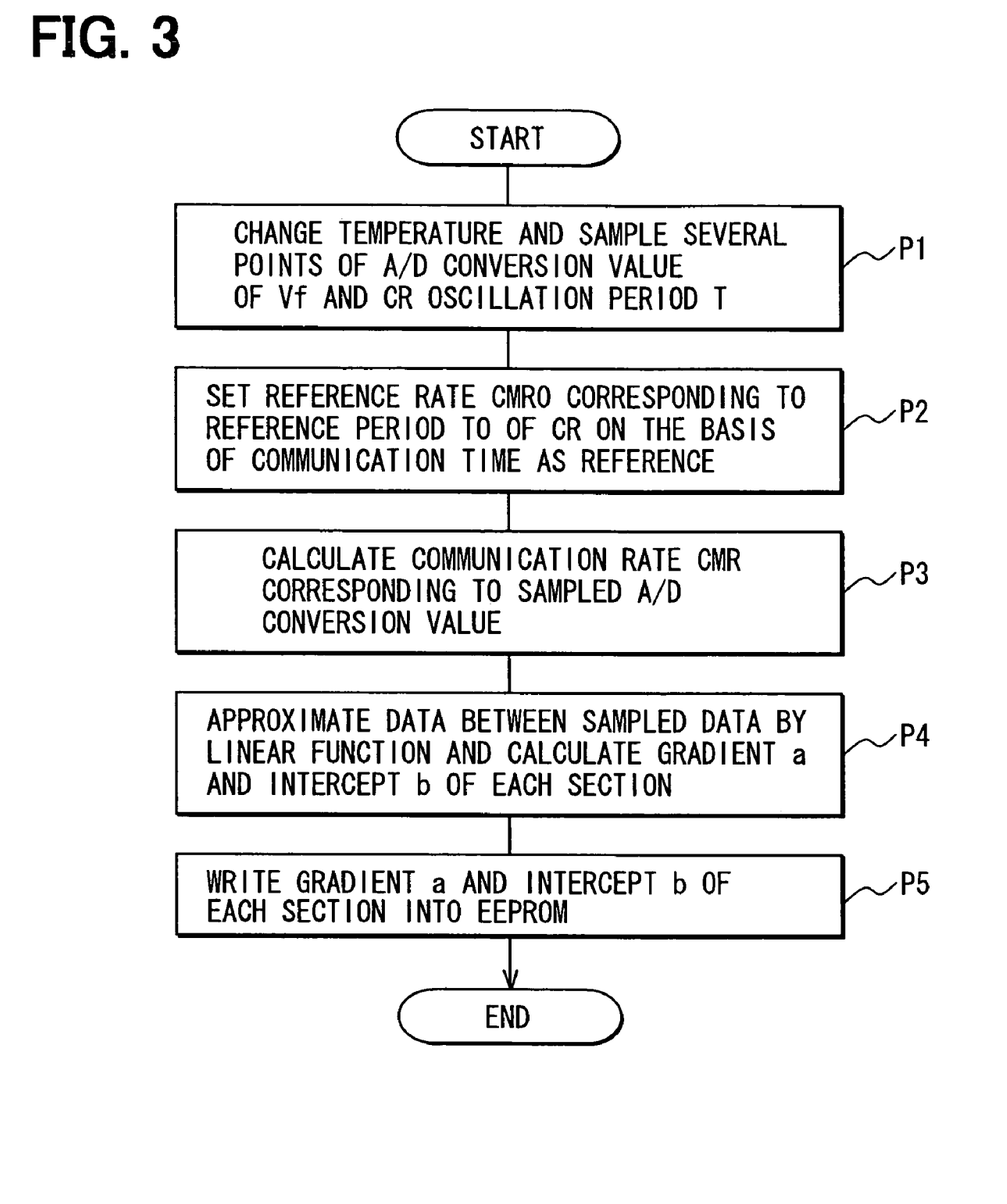
FIG. 3 is a flowchart showing a step of writing and storing a temperature profile into EEPROM before a microcomputer is shipped as a product.

Next, the operation of this embodiment will be described with reference to FIGS. 1 to 5. FIG. 3 is a flowchart showing the step of writing and storing the data into EEPROM 13 before the microcomputer 11 is shipped as a product.

First, the operation environment temperature of the microcomputer 11 is varied at plural stages, and the A/D conversion value of the detection temperature Vf output from the temperature detecting circuit 21 and the oscillation period (or the frequency) of the CR oscillating circuit 20 are measured for each temperature (step P1). Then, when the CR oscillating circuit 20 outputs a signal CLK at an oscillation period T0 as a reference, the communication circuit 17 sets a reference time to serially transmit data of one frame, and sets an (ideal) communication rate CMR0 required to satisfy the reference time concerned (step P2).

For example, when the oscillation period T of the CR oscillating circuit 20 is equal to 10 μs (frequency: 100 kHz) at some temperature (T0), the communication rate CMR is set with respect to the time for which the data are transmitted at 416.6 bps (CMR0). That is, even when the oscillation period T varies in accordance with temperature, the communication rate CMR is set so that the product between the oscillation period T and the communication rate CMR is equal to the product between the reference period T0 and the communication rate CMR0 (T0×CMR0), whereby the data transmission time is fixed. That is, the communication rate CMR corresponding to the oscillation period T is determined according to the following equation:

$$CMR = T0 \times CMR0/T$$

Figure 4:
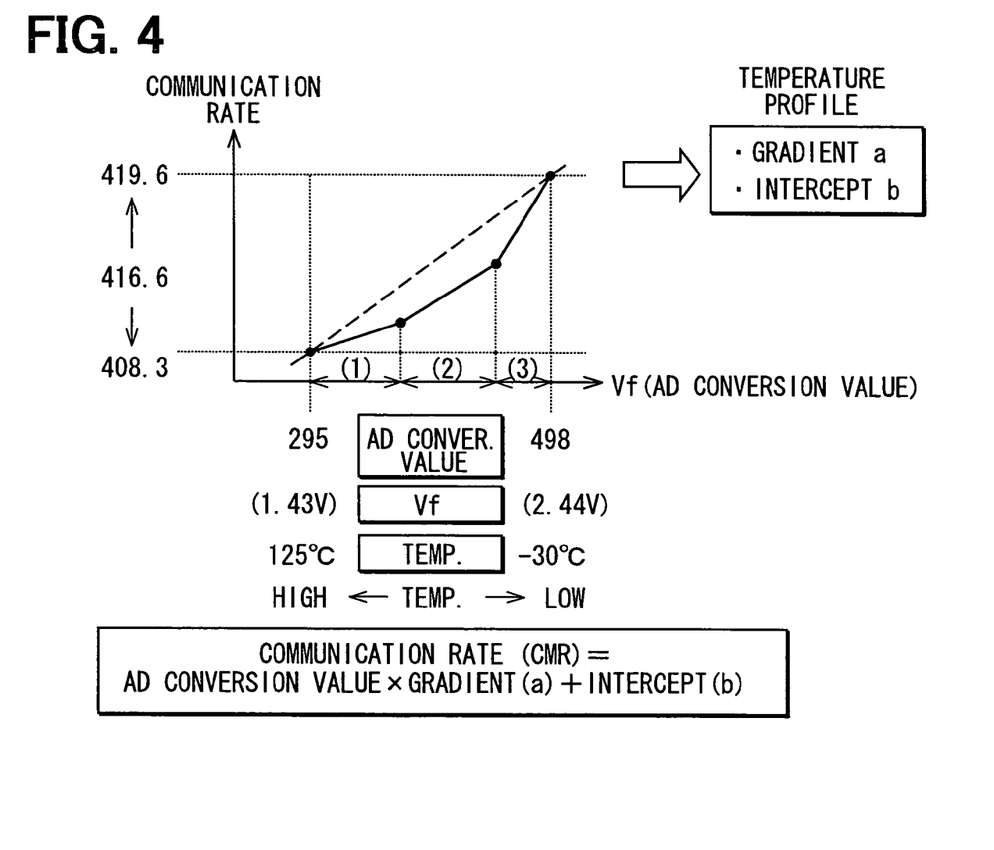
FIG. 4 is a diagram showing the relationship between the A/D conversion value of a detection voltage Vf and the communication rate CMR.

Since the variation of the oscillation period T corresponding to the temperature reflects the A/D conversion value of the detection voltage Vf, the communication rate CMR is set in accordance with the AND conversion value (step P3). FIG. 4 shows an example. For example, when the temperature is equal to −30° C., the detection voltage Vf is equal to 2.44V, the 9 bit A/D conversion value is equal to "498", and the communication rate CMR corresponding to the oscillation period T at that time is set to 419.6 bps. When the temperature is equal to 125°, the detection voltage Vf is equal to 1.43V, the A/D conversion value is equal to "295", and the communication rate CMR corresponding to the oscillation period T at that time is set to 408.3 bps.

Furthermore, when the oscillation frequency T is measured for intermediate values between the above temperature values and the communication rate CMR is set and plotted on a graph, the temperature characteristic of the CR oscillation 20 is not necessarily set to a linear as shown in FIG.

4. Therefore, an intermediate value between the respective points is approximated and interpolated by a linear function. That is, when "a" represents a gradient and "b" represents an intercept, the communication rate CMR is calculated as follows:

$$CMR=a \times (A/D \text{ conversion value})+b$$

For example, with respect to the A/D conversion value ranges (1), (2) and (3) in FIG. 4, the gradient a and the intercept b (function parameters) for each range are prepared (step P4).

Figure 5:
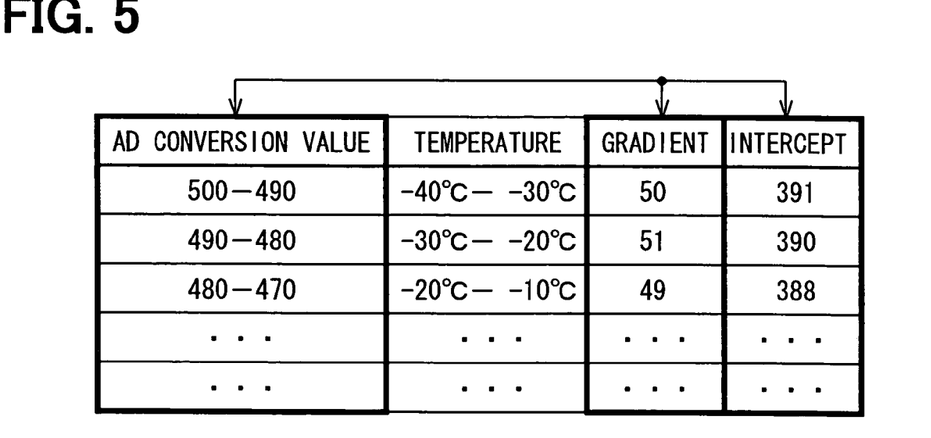
FIG. 5 is a diagram showing an example of a temperature profile.

FIG. 5 shows an example of the temperature profile. The measurement and the calculation processing are carried out as described above to achieve the data shown in FIG. 5. The above items are picked up from these data and set as the temperature profile. In FIG. 5, the function parameters are set every more minute range as compared with the case of FIG. 4. Finally, the gradient a and the intercept b determined in step P4 are written and stored as "temperature profile" in EEPROM 13 of the microcomputer 11 (step P5). Then, the processing of FIG. 3 is finished.

Figure 1:
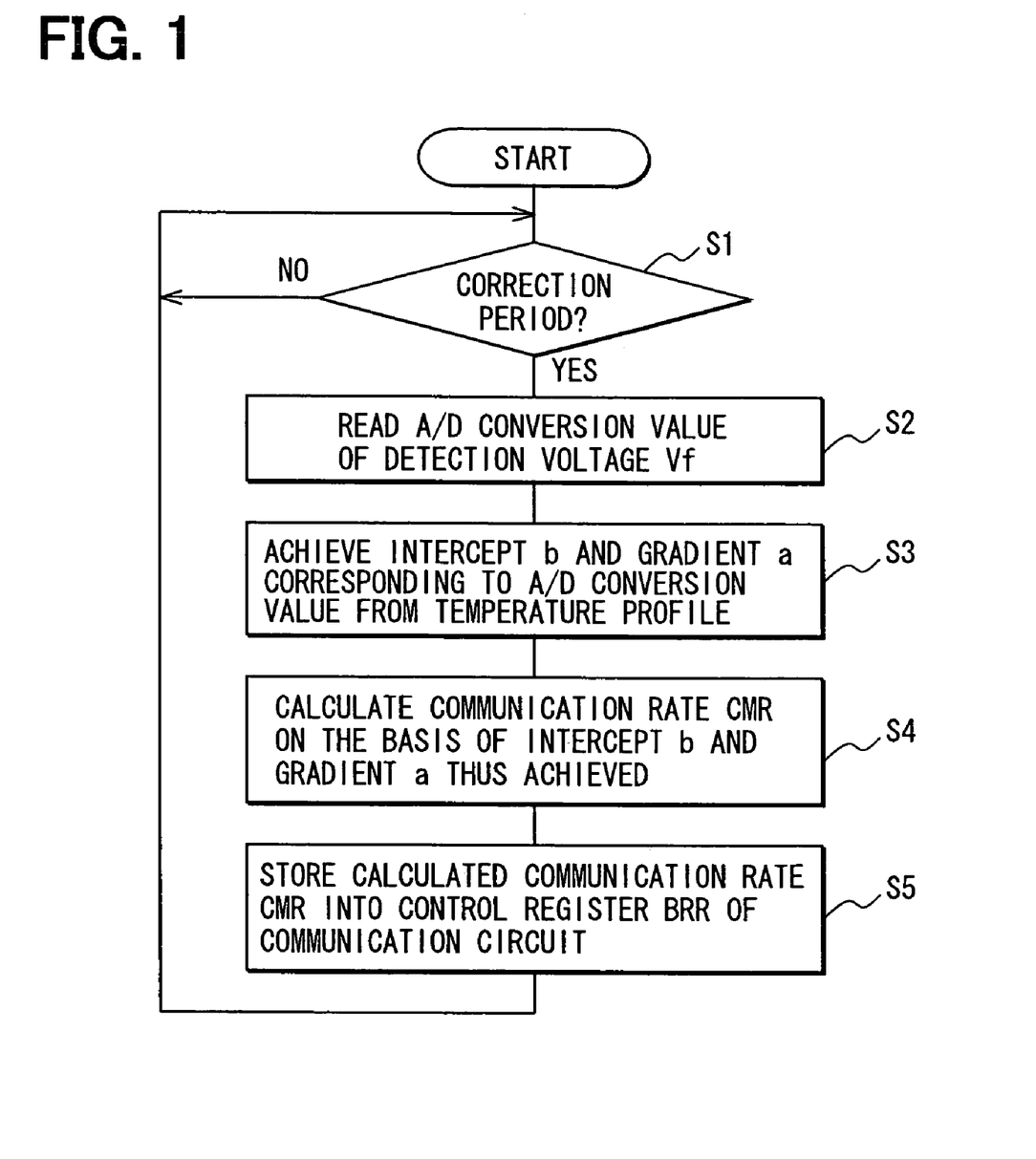
FIG. 1 is a flowchart showing the content of the processing for correcting the communication rate of a communication circuit executed by CPU of a microcomputer.

FIG. 1 is a flowchart showing the content of the processing of correcting the communication rate of the communication circuit 17 when CPU 12 of the microcomputer 11 is actually operated. CPU 12 carries out the correction of the communication rate every fixed period (step S1, "YES"), and carries out the other processing in the other cases "NO" (not shown). FIG. 2 shows an example of the correction timing. The correction timing is not necessarily synchronous with the data transmission timing.

As the correction processing, the A/D conversion value of the detection voltage Vf of the temperature detecting circuit 21 is read in from the A/D conversion circuit 16 (step S2). Then, when the gradient a and the intercept b of the linear function set in connection with the A/D conversion value are read out from the temperature profile stored in EEPROM 13 (step S3), the communication rate CMR is calculated on the basis of the gradient a and the intercept b thus read out (step S4). The calculated communication rate CMR is written and set in a control register BRR of the communication circuit 17 (step S5), the processing returns to step S1.

As described above, according to this embodiment, the data with which the communication rate CMR for fixing the data transmission time of one frame managed by the communication circuit 17 is determined on the basis of the oscillation output characteristic of the CR oscillating circuit 20 which is varied with the temperature are stored in EEPROM 13 of the microcomputer 11, and CPU 12 reads out data stored in EEPROM 13 in connection with the temperature detected by the temperature detecting circuit 21 and sets the determined communication rate CMR into the communication circuit 17.

Accordingly, even when the oscillation frequency of the CR oscillating circuit 20 is varied in accordance with the temperature variation, the communication circuit 17 is controlled so that the data transmission time is fixed. Therefore, there is not required any complicated correcting circuit for directly varying the time constant of the CR oscillating circuit 20. Furthermore, with respect to the communication processing, there are some cases where the synchronization of the processing timing is established between the transmission side and the reception side or it is required to secure the isochronism for the transmission time of the data of one frame. Therefore, by applying the present embodiment to these cases, the data transmission time can be corrected so as to be fixed by a simple construction. Furthermore, the microcomputer 11 can be designed in a compact size.

Since CPU 12 calculates and determines the communication rate CMR on the basis of a linear function based on a gradient a and an intercept b read out from EEPROM 13, the interpolation can be performed by achieving the communication rate CMR approximated by the linear function, and thus the data amount to be stored in EEPROM 13 can be reduced. Furthermore, CPU 12 periodically corrects the communication rate CMR, and thus the data transmission time can be stably kept.

Second Embodiment

Figure 7:
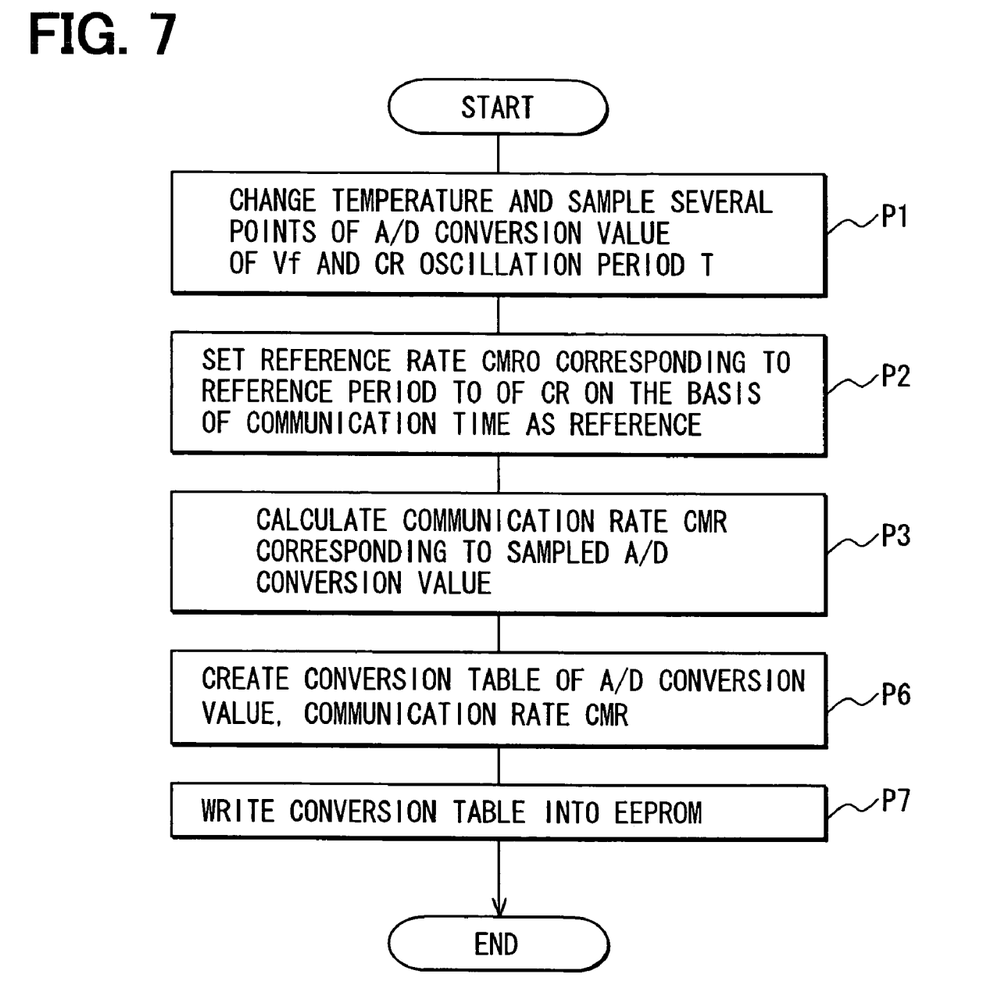
FIG. 7 shows a second embodiment which is a diagram corresponding to FIG. 3.
Figure 8:
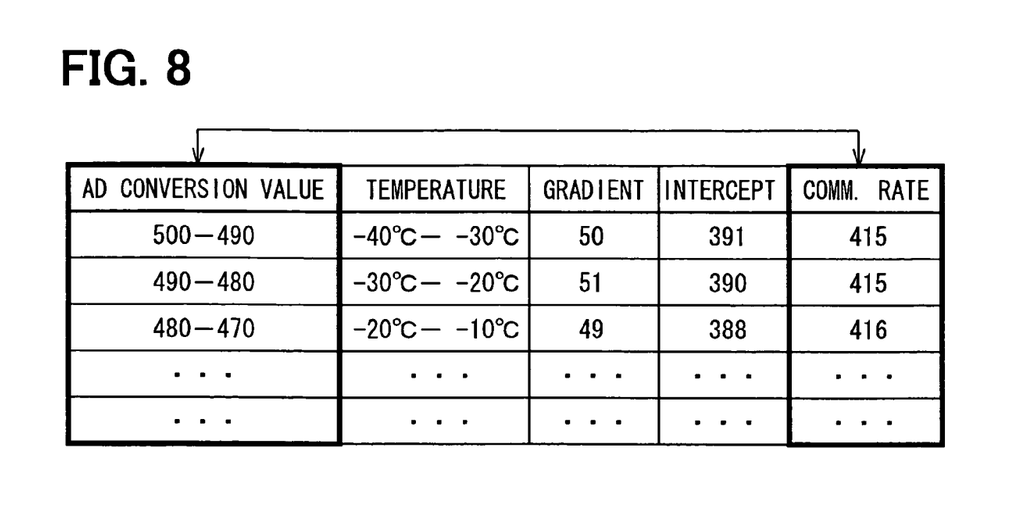
FIG. 8 is a diagram corresponding to FIG. 5.
Figure 9:
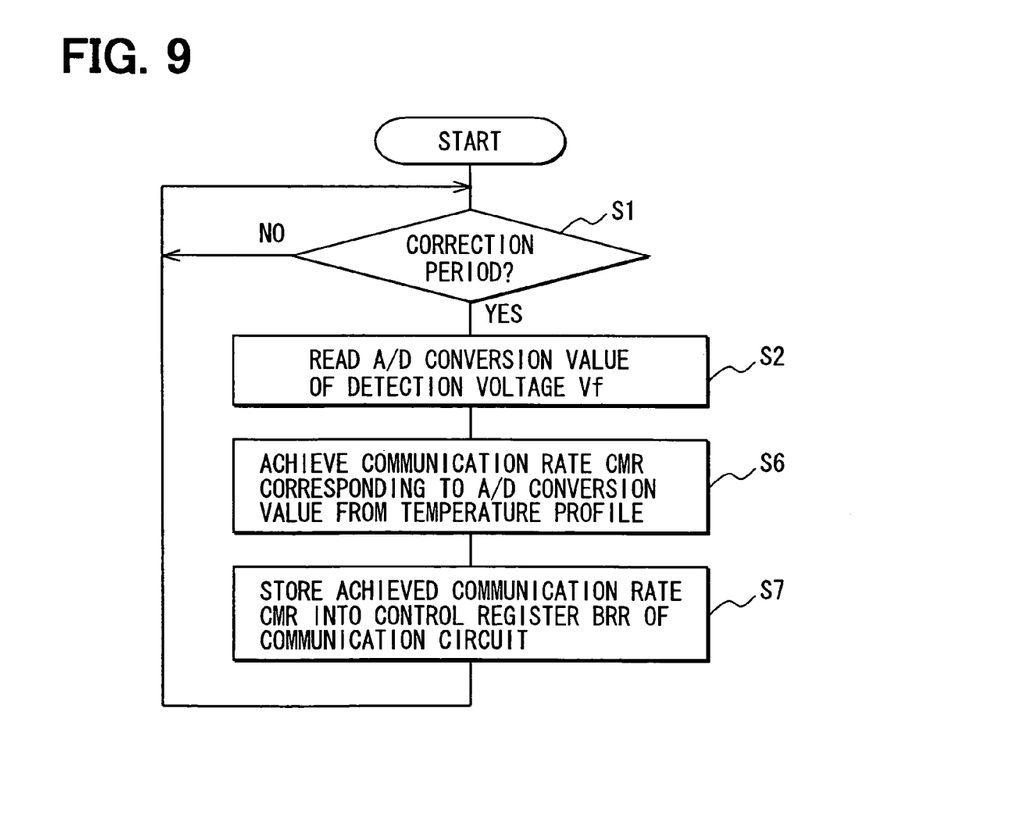
FIG. 9 is a diagram corresponding to FIG. 1.

FIGS. 7 to 9 show a second embodiment. The same parts as the first embodiment are represented by the same reference numerals, the description thereof is omitted, and only the different portion will be described. In the second embodiment, the communication rate CMR corresponding to the detection temperature, that is, the A/D conversion value is directly stored as a data table in EEPROM 13.

That is, FIG. 7 is a diagram corresponding to FIG. 3 shown in the first embodiment, however, the steps P1 to P3 are executed as in the case of the first embodiment. When the communication rates CMR corresponding to respective A/D conversion values are calculated in step P3, these communication rates CMR are set as representative values for predetermined ranges of the A/D conversion values to create a conversion table (step P6). FIG. 8 shows an example of the conversion table. The conversion table thus created is written and stored as a temperature profile in EEPROM 13 (step P7).

Next, the operation of the second embodiment will be described with reference to FIG. 9. FIG. 9 is a diagram corresponding to FIG. 1. When executing step S2, CPU 12 reads out the communication rate CMR corresponding to the range to which the A/D conversion belongs, from the conversion table stored in the EEPROM 13 (step S6). Then, CPU 12 writes and sets the thus-achieved communication rate CMR into the control register of the communication circuit 17 (step S7), and then returns to step S1.

As described above, according to the second embodiment, the communication rates CMR corresponding to the ranges to which the A/D conversion values belong are stored as the conversion table in advance, and CPU 12 sets the communication rate CMR read out from EEPROM 13 into the communication circuit 17. Accordingly, CPU 12 is not required to calculate and determine the communication rate CMR, and thus CPU 12 can make the correction quickly.

Third Embodiment

Figure 10:
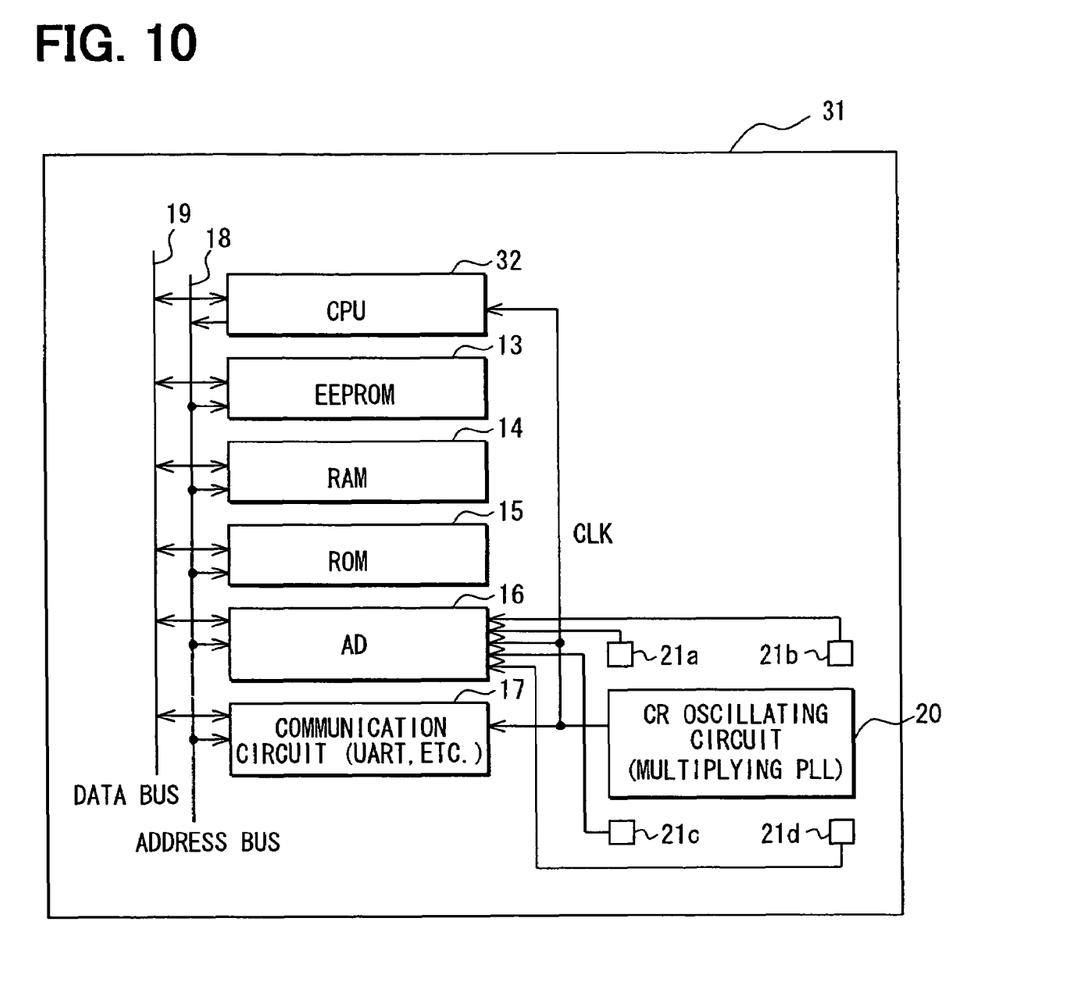
FIG. 10 shows a third embodiment which is a diagram corresponding to FIG. 6.
Figure 11:
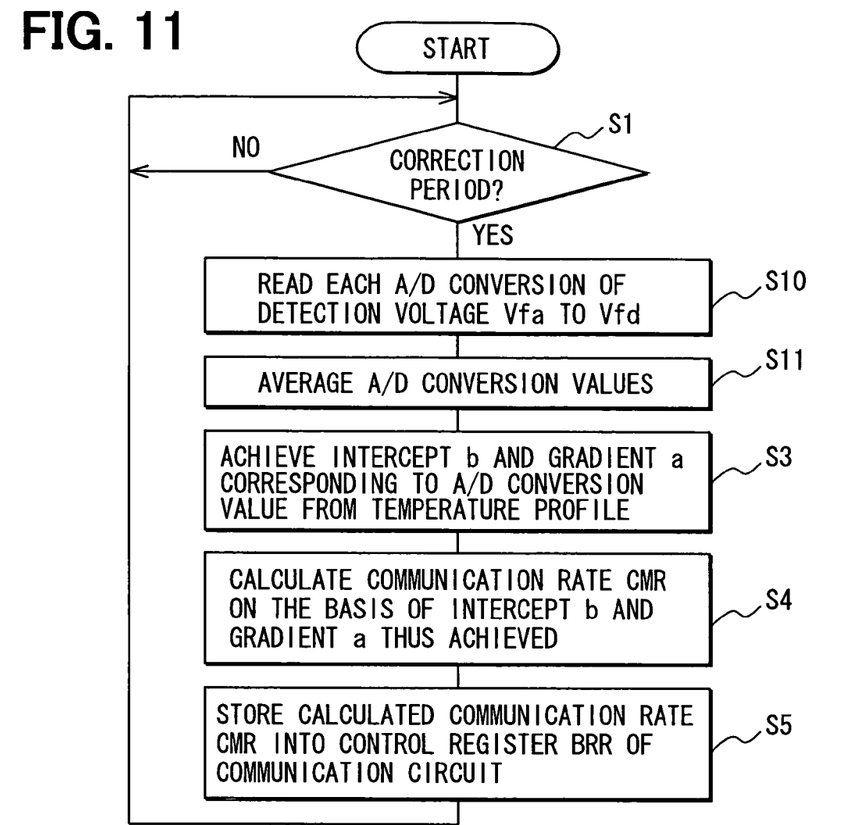
FIG. 11 is a diagram corresponding to FIG. 1.

FIGS. 10 and 11 show a third embodiment. Only the different portion from the first embodiment will be described. In FIG. 11 corresponding to FIG. 6, four temperature detecting circuits 21a to 21b are arranged around the CR oscillating circuit 20, for example, in the neighborhood of the four corners of a circuit forming area. All the detection outputs of the temperature detecting circuits 21a to 21d are input to the AND conversion circuit 16, and the A/D conversion circuit 16 subjects each of the detection outputs of the temperature detecting circuits 21a to 21d to A/D conversion while successively switching the input thereof.

Next, the operation of the third embodiment will be described with reference to FIG. 11. FIG. 11 is a diagram corresponding to FIG. 1 showing the first embodiment. CPU 32 replacing CPU 12 successively reads the A/D conversion values of the detection voltages Vfa to Vfd of the four temperature detecting circuits 21*a* to 21*d* from the A/D conversion circuit 16 in step S10 replacing the step S2. Then, CPU 32 averages the A/D conversion values corresponding to the respective detection voltages Vfa to Vfd (step S11), and then reads out the gradient a and the intercept b of a primary function from the temperature profile stored in EEPROM 13 for the average result in subsequent step S3. The other processing is the same as the first embodiment.

That is, the temperature distribution of the semiconductor substrate on which the microcomputer 31 having the CR oscillating circuit 20 is mounted is not necessarily uniform. Specifically, when the microcomputer 31 is equipped with an external driving transistor in which relatively large current flows, the mount area of the driving transistor and its peripheral area may be locally increased in temperature. Accordingly, the peripheral temperature of the CR oscillating circuit 21 is detected at plural places and the detection temperature values are averaged, thereby enhancing the detection precision.

As described above, according to the third embodiment, the four temperature detecting circuits 21*a* to 21*d* are arranged around the CR oscillating circuit 20, and CPU 32 averages the A/D conversion values of the detection voltages Vfa to Vfd and reads out the data stored in EEPROM 13 on the basis of the average result. Accordingly, even when some deviation occurs in the temperature distribution of the semiconductor substrate on which the microcomputer 31 having the CR oscillating circuit 20 is mounted, the detection precision can be enhanced, and the data transmission time can be further stably kept.

The presents invention is not limited to the embodiments described above or shown in the figures, and following modifications may be made.

The correction processing may be carried out in synchronism with the communication processing. Furthermore, it is not necessarily executed periodically, and for example it may be executed at the timing when a predetermined event occurs. For example, when data transmission is started, the correction processing may be executed only once at the initial stage.

Furthermore, the temperature characteristic of the CR oscillating circuit 20 may be approximated by a quadratic function, for example.

The processing circuit is not limited to the communication circuit 17, and it may be applied to a circuit of counting a timer interruption number occurring on the basis of an oscillation output of the CR oscillating circuit and executing some regular processing. That is, CPU may be a processing circuit.

The second embodiment and the third embodiment may be executed in combination.

The arrangement number of the temperature detecting circuits 21 of the third embodiment may be set to "2 or 3" or "5 or more". The plural temperature detecting circuits 21 may be arranged at suitable intervals around the CR oscillating circuit.

The temperature detecting unit is not limited to the temperature detecting circuit 21, and any circuit may be used insofar as it is constructed to detect the temperature.

What is claimed is:

1. A microcomputer comprising:
    a CR oscillating circuit;
    a processing circuit for managing a time required to execute predetermined processing based upon an oscillation signal output from the CR oscillating circuit for fixing the time;
    a temperature detecting unit for detecting the temperature of a periphery of the CR oscillating circuit;
    a storage unit in which data is stored, the data for determining a control value based upon an oscillation output characteristic of the CR oscillating circuit that varies in accordance with temperature, the control value being used so that the processing time managed by the processing circuit is fixed; and
    a control circuit for reading out the data stored in the storage unit in accordance with temperature detected by the temperature detecting unit, determines the control value and sets the control value in the processing circuit,
    wherein the processing circuit executes communication processing, and the control value is a communication rate in the communication processing.

2. The microcomputer according to claim 1, wherein a plurality of temperature detecting units are disposed around the CR oscillating circuit, and the control circuit averages the temperature values detected by the plural temperature detecting units and reads out the data stored in the storage unit on the basis of the average result.

3. The microcomputer according to claim 1, wherein function parameters for calculating the control value in accordance with temperature are stored in the storage unit, and the control circuit calculates and determines the control value on the basis of the function parameters read out from the storage unit.

4. The microcomputer according to claim 1, wherein a control value to be set in accordance with temperature is stored in the storage unit, and the control circuit sets the control value read out from the storage unit into the processing circuit.

5. The microcomputer according to claims 1, wherein the control circuit is designed to periodically set the control value.

6. The microcomputer according to claim 2, wherein function parameters for calculating the control value in accordance with temperature are stored in the storage unit, and the control circuit calculates and determines the control value on the basis of the function parameters read out from the storage unit.

7. The microcomputer according to claim 2, wherein a control value to be set in accordance with temperature is stored in the storage unit, and the control circuit sets the control value read out from the storage unit into the processing circuit.

8. The microcomputer according to claim 7, wherein the control circuit is designed to periodically set the control value.

9. The microcomputer according to claim 8, wherein the processing circuit executes communication processing, and the control value is a communication rate in the communication processing.

10. A microcomputer comprising:
    a CR oscillating circuit;
    a processing circuit for managing a time required to execute predetermined processing based upon an oscillation signal output from the CR oscillating circuit for fixing the time;
    a temperature detecting unit for detecting the temperature of a periphery of the CR oscillating circuit;
    a storage unit in which data for determining a control value based upon an oscillation output characteristic of the CR oscillating circuit that varies in accordance with temperature, the control value being used so that the processing time managed by the processing circuit is fixed; and a control circuit for reading out the data stored in the storage unit in accordance with temperature detected by the temperature detecting unit, determining the control value and setting the control value in the processing circuit, wherein a plurality of temperature detecting units are disposed around the CR oscillating circuit, and the control circuit averages the temperature values detected by the plural temperature detecting units and reads out the data stored in the storage unit on the basis of the average result.

11. The microcomputer according to claim 10, wherein function parameters for calculating the control value in accordance with temperature are stored in the storage unit, and the control circuit calculates and determines the control value on the basis of the function parameters read out from the storage unit.

12. The microcomputer according to claim 10, wherein a control value to be set in accordance with temperature is stored in the storage unit, and the control circuit sets the control value read out from the storage unit into the processing circuit.

13. The microcomputer according to claim 12, wherein the control circuit is designed to periodically set the control value.

14. The microcomputer according to claim 13, wherein the processing circuit executes communication processing, and the control value is a communication rate in the communication processing.

* * * * *